US012746566B2

(12) United States Patent
Chen et al.

(10) Patent No.: US 12,746,566 B2
(45) Date of Patent: Sep. 29, 2026

(54) LIQUID INTRODUCTION APPARATUS AND ADHESIVE DISPENSING APPARATUS

(71) Applicant: Fulian Yuzhan Precision Technology Co., Ltd., Shenzhen (CN)

(72) Inventors: Xiao-Ping Chen, Shenzhen (CN); Peng Xie, Shenzhen (CN); Shun-Fa Yan, Shenzhen (CN); Zhi-Chao Xu, Shenzhen (CN); Jian Gong, Shenzhen (CN); Guang-Tao Shan, Shenzhen (CN); Ya-Wei Zeng, Shenzhen (CN); Yong Chen, Shenzhen (CN); Jian-Jun Xiang, Shenzhen (CN); Zheng-Shi Xu, Shenzhen (CN)

(73) Assignee: Fulian Yuzhan Precision Technology Co., Ltd., Shenzhen (CN)

(*) Notice: Subject to any disclaimer, the term of this patent is extended or adjusted under 35 U.S.C. 154(b) by 706 days.

(21) Appl. No.: 18/140,518

(22) Filed: Apr. 27, 2023

(65) Prior Publication Data

US 2023/0347374 A1 Nov. 2, 2023

(30) Foreign Application Priority Data

Apr. 29, 2022 (CN) ......................... 202210474893.8

(51) Int. Cl.
*B05C 7/02* (2006.01)
*B05C 11/10* (2006.01)

(52) U.S. Cl.
CPC ............ *B05C 7/02* (2013.01); *B05C 11/1039* (2013.01)

(58) Field of Classification Search
CPC ......... B05C 7/02; B05C 5/02; B05C 11/1039; B28C 38/42; B29C 39/10; B29C 64/364; B05B 15/50–52
See application file for complete search history.

(56) References Cited

U.S. PATENT DOCUMENTS

| | | | | |
|---|---|---|---|---|
| 4,259,372 | A * | 3/1981 | Eddy | B05C 13/025 156/218 |
| 4,997,606 | A * | 3/1991 | Mears | B29C 39/42 264/102 |
| 2017/0008755 | A1* | 1/2017 | Ishida | B05C 11/1034 |
| 2018/0126671 | A1* | 5/2018 | Wilenski | B29C 64/118 |

(Continued)

FOREIGN PATENT DOCUMENTS

| | | | |
|---|---|---|---|
| CN | 207667935 | U | 7/2018 |
| CN | 207756393 | U | 8/2018 |
| CN | 207971039 | U * | 10/2018 |

(Continued)

OTHER PUBLICATIONS

Liu (CN 207971039) text and translation (Year: 2018).*

*Primary Examiner* — Dah-Wei D. Yuan
*Assistant Examiner* — Stephen A Kitt
(74) *Attorney, Agent, or Firm* — ScienBiziP, P.C.

(57) ABSTRACT

A liquid introduction apparatus for introducing glue or other liquid into a product includes a platform and a housing mounted to the platform for defining a confined space. The confined space can form a sealed vacuum environment, and an introduction mechanism is arranged on the platform and is configured for introducing liquid into the product in a vacuum environment by discharging air from the confined space. The disclosure also provides an adhesive dispensing apparatus.

20 Claims, 4 Drawing Sheets

(56) References Cited

U.S. PATENT DOCUMENTS

| | | | | |
|---|---|---|---|---|
| 2018/0194051 | A1 | 7/2018 | Suzuki | |
| 2020/0188307 | A1* | 6/2020 | Freiderikos .......... | A61K 9/2095 |

FOREIGN PATENT DOCUMENTS

| | | | |
|---|---|---|---|
| CN | 111054582 | A | 4/2020 |
| CN | 108834407 | B | 5/2021 |
| CN | 113441355 | A | 9/2021 |
| CN | 214637805 | U | 11/2021 |

* cited by examiner

LIQUID INTRODUCTION APPARATUS AND ADHESIVE DISPENSING APPARATUS

CROSS-REFERENCE TO RELATED APPLICATION

This application claims priority to China Application No. 202210474893.8, having a filing date of Apr. 29, 2022, filed in China State Intellectual Property Administration, the entire contents of which are hereby incorporate by reference. This application is also related a co-pending U.S. patent application Ser. No. 18/140,521, each entitled "LIQUID INTRODUCTION APPARATUS, ADHESIVE DISPENSING APPARATUS AND LIQUID INTRODUCTION METHOD", and each invented by XIAO-PING CHEN et al. These applications have the same assignee as the present application. The above-identified applications are incorporated herein by reference.

FIELD

The subject matter relates to glue or adhesive filling technologies, and more particularly, relates to a liquid introduction apparatus and an adhesive dispensing apparatus.

BACKGROUND

A filling machine for glue or adhesive is generally used for filling glue or adhesive into space of products, then the glue is cured in the products by light. However, when the glue is being filled into the product by the glue filling machine, the glue flows slowly into the space of the products due to its viscosity, resulting in a low production efficiency. Further, any air in the space within products may be easily trapped inside the glue, which brings poor filling saturation, insufficient compactness of the glue, and low yield rate of the products.

Therefore, there is room for improvement within the art.

SUMMARY

An objective of the present disclosure is achieved by providing a liquid introduction apparatus configured for introducing liquid into a product. The liquid introduction apparatus includes a platform, an introduction mechanism, and a housing. Specifically, the platform is configured for supporting the product, the introduction mechanism is arranged on the platform, the housing is mounted to the platform and defines a confined space, the introduction mechanism and the product are received in the confined space. The introduction mechanism is configured for introducing liquid into the product after the confined space has a vacuum environment.

BRIEF DESCRIPTION OF THE DRAWINGS

Implementations of the present technology will now be described, by way of example only, with reference to the attached figures.

DETAILED DESCRIPTION

Figure 1:
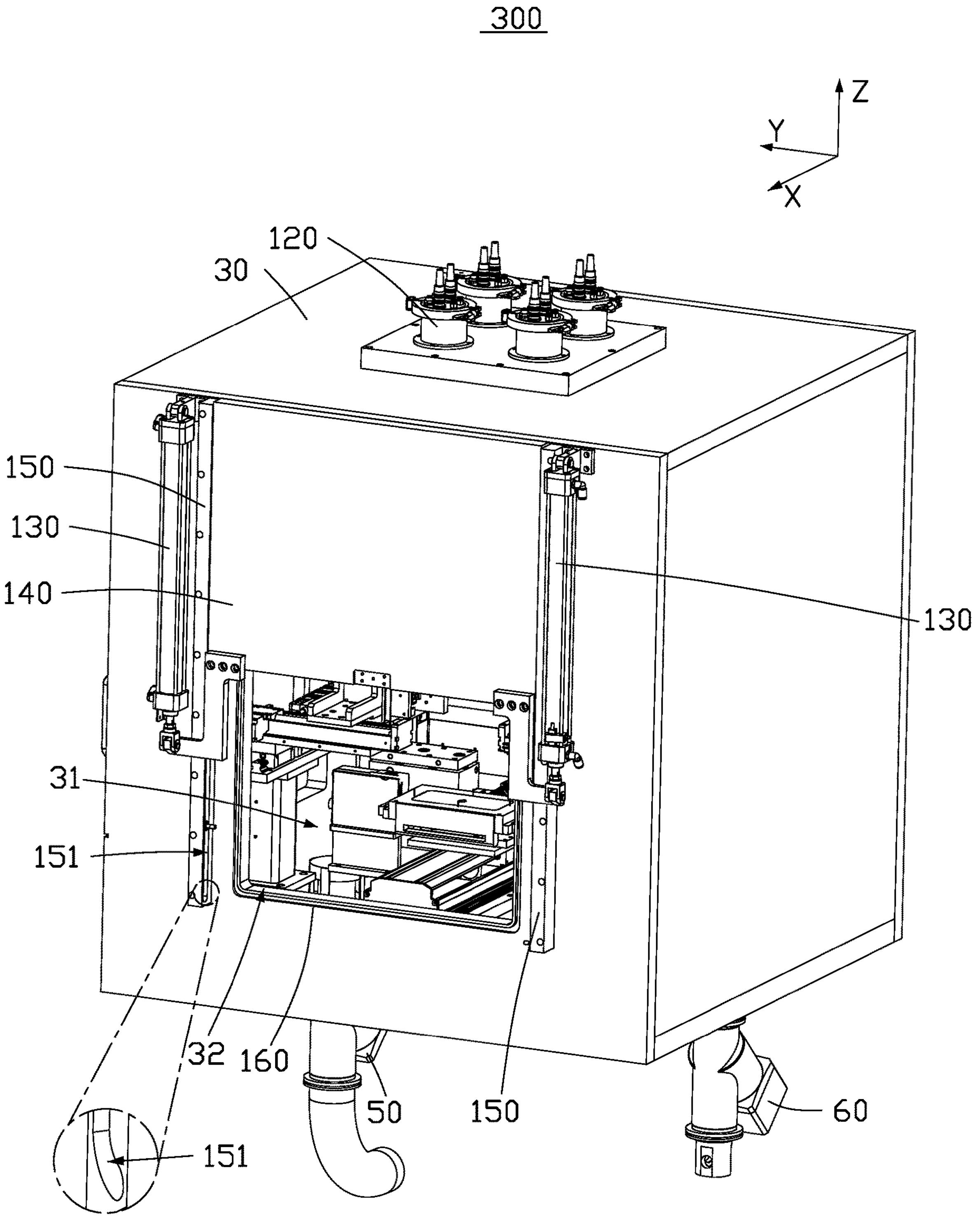
FIG. 1 is a perspective view of a liquid introduction apparatus according to an embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish between elements and are not used to denote a particular order or imply a number of technical features, therefore, unless specifically defined, features described as "first" and "second" may expressly or implicitly include one or more of the stated features. In the description of the present application, "plurality" means "two or more", unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

A description of the hereinafter described embodiments of the disclosure is presented herein with reference to the figures by way of exemplification and not as a limitation.

Figure 2:
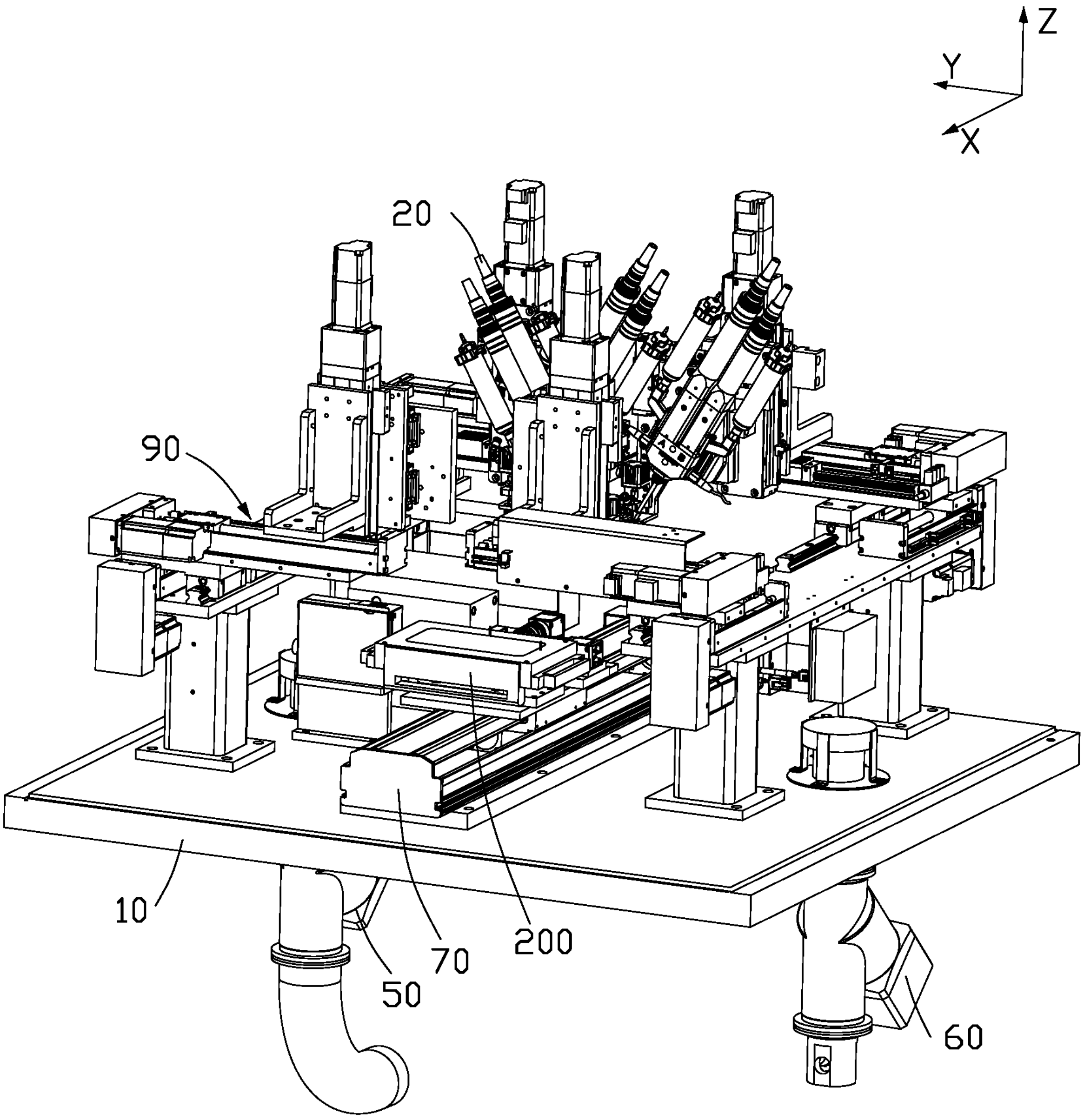
FIG. 2 is a perspective view of a platform, an introduction mechanism, and other structures of the liquid introduction apparatus of FIG. 1.

Referring to FIG. 1, an embodiment of a liquid introduction apparatus 300 is provided, the liquid introduction apparatus 300 is configured to inject liquid into a product 200 (as shown in FIG. 2), and the liquid may be stored in the product 200, further, the injected liquid may be cured in the product 200. Understandably, the product 200 may be an injection mold, the injection mold may further include a workpiece. The liquid may be a single type of glue or adhesive. Alternatively the liquid may be a mixture of various types of glue or adhesive. When the product 200 is an injection mold including a workpiece placed therein, the liquid is injected into the injection mold and is coated on a periphery of the workpiece. After the liquid is cured by light or heat, the liquid is directly combined with the workpiece. The workpiece may be a backlight mechanism, or any other mechanism that needs to be connected to a component by glue or adhesive. In at least one embodiment, the liquid may be sealing oil or any other fluid.

Figure 3:
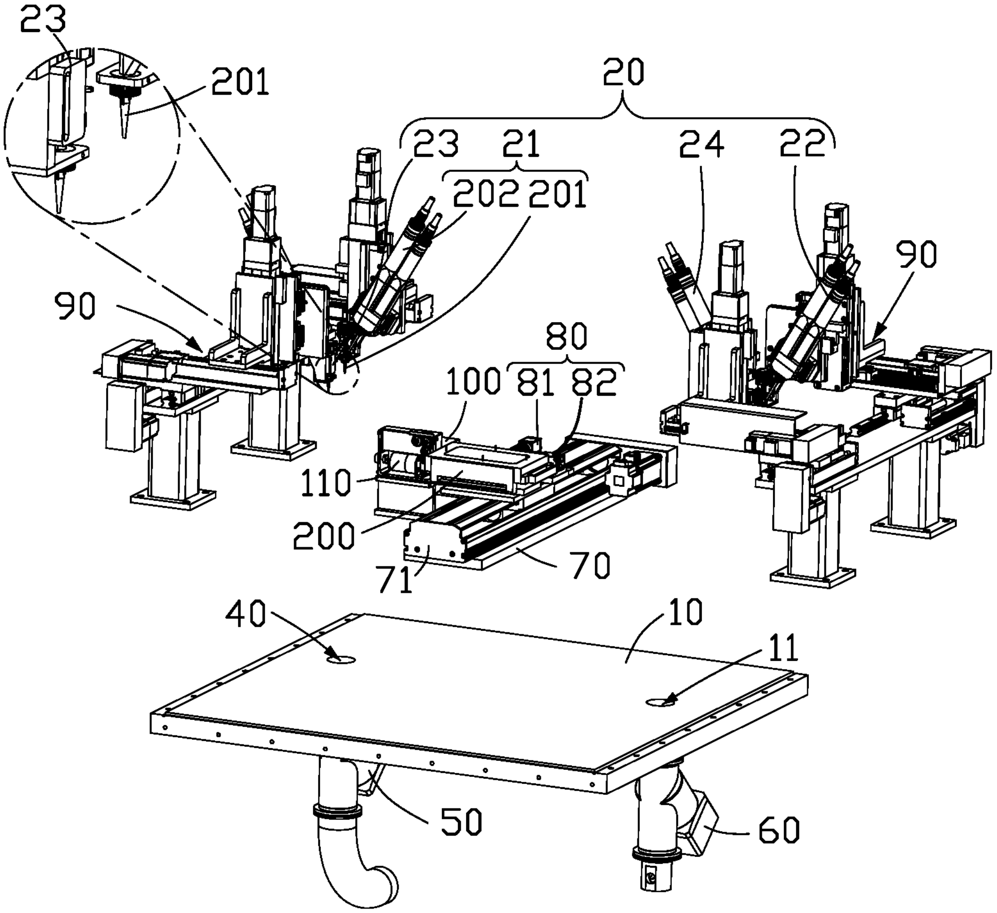
FIG. 3 is an exploded view of the platform, the introduction mechanism, and other structures in FIG. 2.

Referring to FIG. 2 and FIG. 3, the liquid introduction apparatus 300 includes a platform 10, an introduction mechanism 20, and a housing 30.

The product 200 is supported on the platform 10. The platform 10 is further used for supporting the introduction mechanism 20 and the housing 30. The introduction mechanism 20 is arranged on the platform 10 and configured to inject liquid into the product 200. The housing 30 is mounted on the platform 10, and a confined space 31 is defined by the housing 30 and the platform 10. The introduction mechanism 20 and the product 200 are both located in the confined space 31. The introduction mechanism 20 begins to dispense liquid into the product 200 after the confined space 31 has a vacuum environment.

According to some embodiments, an extraction port 40 is provided in the liquid introduction apparatus 300. The extraction port 40 is connected to a device such as an air extracting apparatus (not shown) for discharging air from the confined space 31. In this embodiment, the extraction port 40 is formed in the platform 10. It should be noted that, the extraction port 40 may be formed in the housing 30 in other embodiments. The air extracting apparatus can discharge the air from the confined space 31 via the extraction port 40 to allow the confined space 31 to have a vacuum environment.

Since the liquid introduction apparatus 100 works in a vacuum environment, the fluid introduction process avoids influences by outer environment changes. In addition, the vacuum environment eliminates influence of air or air flow affecting the flow or introduction of the liquid, the liquid can flow smoothly in the product 200 at a higher speed in the vacuum environment than that in a non-vacuum environment, thus the efficiency of introduction and the production efficiency of the products 200 can be improved. Furthermore, the vacuum environment helps to avoid generating bubbles in the liquid, the liquid can be filled more uniformly in the product 200, which is beneficial to eliminate defects such as poor filling saturation or insufficient compactness after the liquid is cured in the product 200, so that the yield rate of the production can be improved.

Referring to FIG. 2 and FIG. 3, according to further embodiments, the liquid introduction apparatus 300 may further include a first valve 50 for controlling communication between the air extracting apparatus and the extraction port 40. The first valve 50 is arranged between the air extracting apparatus and the extraction port 40. The first valve 50 can be switched on and off to connect or disconnect the air extracting apparatus with the extraction port 40. When the first valve 50 is switched on, the air extracting apparatus can discharge air from the confined space 31 until the confined space 31 has a vacuum environment satisfying a certain level of vacuum. In at least one embodiment, the first valve 50 may be a solenoid valve or any other apparatus having an on-off function.

The liquid introduction apparatus 300 may further include a second valve 60. A vacuum breaking port 11 may be defined in the platform 10. The second valve 60 is connected to the vacuum breaking port 11. The second valve 60 communicates the vacuum breaking port 11 with an external atmosphere to break the vacuum environment in the confined space 31. It allows the confined space 31 to be easily opened in vacuum-breaking environment so that the product 200 can be put into/removed from the confined space 31. In this embodiment, the second valve 60 can be a solenoid valve or any other apparatus having an on-off function.

Alternatively, the second valve 60 and the first valve 50 may be both connected to the air extraction port 40, and the vacuum breaking port 11 can be omitted.

Referring to FIG. 2 and FIG. 3, in further embodiments, the liquid introduction apparatus 300 may further include a transfer mechanism 70. The transfer mechanism 70 is arranged on the platform 10 and received in the confined space 31, and the transfer mechanism 70 is configured to move the product 200 along a predetermined movement direction. The transfer mechanism 70 can carry the product 200 to move under the introduction mechanism 20 for facilitating the introduction mechanism 20 to inject adhesive or glue into the product 200. In this embodiment, the transfer mechanism 70 can be a linear transfer mechanism or any other mechanism which can carry the product 200 along the predetermined movement direction. In this embodiment, the predetermined movement direction of the transfer mechanism 70 may be X-axis direction as shown in FIG. 2.

Referring to FIG. 3, the introduction mechanism 20 includes an introduction nozzle 201 disposed at one end. The introduction nozzle 201 is configured to connect the introduction mechanism 300 to the product 200 and injecting the liquid into the product 200. In this embodiment, the introduction nozzle 201 can be inserted in the product 200 to allow the glue or adhesive to be filled into the product 200. The adhesive or glue will be prevented from flowing onto an outer surface of the product 200, and the product 200 can be prevented from contamination.

Referring to FIG. 3, in further embodiments, the liquid introduction apparatus 300 may further include an image acquisition device 80. The image acquisition device 80 is arranged on the transfer mechanism 70 and moves with the transfer mechanism 70 together. The image acquisition device 80 is capable of aligning the introduction nozzle 201 with the product 200. Specifically, the image acquisition device 80 can acquire images of the introduction nozzle 201 and the product 200 for determining whether the introduction nozzle 201 is inclined to the product 200. When the introduction nozzle 201 is inclined to the product 200, the position of the introduction nozzle 201 can be adjusted according to the image acquired by the image acquisition device 80 to align the introduction nozzle 201 with the product 200. The image acquisition device 80 may include a first camera 81 arranged in X-axis direction and a second camera 82 arranged in Y-axis direction. The first camera 81 and the second camera 82 acquire images of the introduction nozzle 201 from different directions, and the image acquisition device 80 determines whether the introduction nozzle 201 is inclined to the product 200 according to the images. If the introduction nozzle 201 is inclined to the product 200, the introduction nozzle 201 can be adjusted manually or by a mechanism (such as the nozzle driving mechanism 90 described later) to be perpendicular to the product 200 so that the introduction nozzle 201 can be accurately inserted into the product 200. No adjustment is required if the introduction nozzle 201 is not inclined to the product 200. The image acquisition device 80 ensures that the introduction nozzle 201 has a precision position relative to the product 200 by avoiding inclination or obliqueness of the introduction nozzle 201. Therefore, an effective connection between the introduction nozzle 201 and the product 200 is formed.

Referring to FIG. 3, the introduction mechanism 20 includes a reservoir 202 for storing the liquid. The reservoir 202 is connected to the introduction nozzle 201. The reservoir 202 can store two or more types of liquid, or a liquid mixture for different products 200.

Referring to FIG. 3, according to further embodiments, the introduction mechanism 20 includes a first introduction mechanism 21 and a second introduction mechanism 22, the transfer mechanism 70 includes a guiding rail 71 extending along the X direction. The first introduction mechanism 21 and the second introduction mechanism 22 are located on opposite sides of the guiding rail 71, and at least one of the first introduction mechanism 21 and the second introduction mechanism 22 is used for introducing liquid in the product 200. The arrangement of the first introduction mechanism 21 and the second introduction mechanism 22 can improve the efficiency of the introduction and the production efficiency of the product 200. Besides, the arrangement of the first introduction mechanism 21 and the second introduction mechanism 22 make it easy to introduce liquid into different products 200.

Alternatively, the introduction mechanism 20 may further include a third introduction mechanism 23 and a fourth introduction mechanism 24. At least one of the first introduction mechanism 21, the second introduction mechanism 22, the third introduction mechanism 23, and the fourth introduction mechanism 24 can be used for introducing liquid in the product 200.

Referring to FIG. 3, in further embodiments, the liquid introduction apparatus may further include a nozzle driving mechanism 90. The nozzle driving mechanism 90 is arranged on the platform 10 and received in the confined space 31. The nozzle driving mechanism 90 is connected to the introduction nozzle 201 and configured to drive the introduction nozzle 201 to move to connect the introduction nozzle 201 to the product 200. The introduction nozzle 201 can be inserted into the product 200 accurately by a cooperation of the nozzle driving mechanism 90 and the transfer mechanism 70. The nozzle driving mechanism 90 can be a 3-axis straight-line motion mechanism, a robot, or any other mechanism capable of moving and positioning the introduction nozzle 201. The nozzle driving mechanism 90 can move the introduction nozzle 201 along at least one direction of X-axis, Y-axis, or Z-axis shown in FIG. 3.

According to further embodiments, the number of the nozzle driving mechanisms 90 may be equal to the number of the introduction mechanisms 20, and each nozzle driving mechanism 90 is arranged to correspond to one introduction mechanism 20. Therefore, each nozzle driving mechanism 90 moves the respective introduction nozzle 201 to connect the introduction nozzle 201 to different portions of the product 200, as different types of products 200 may require to be introduced at different portions.

Figure 4:
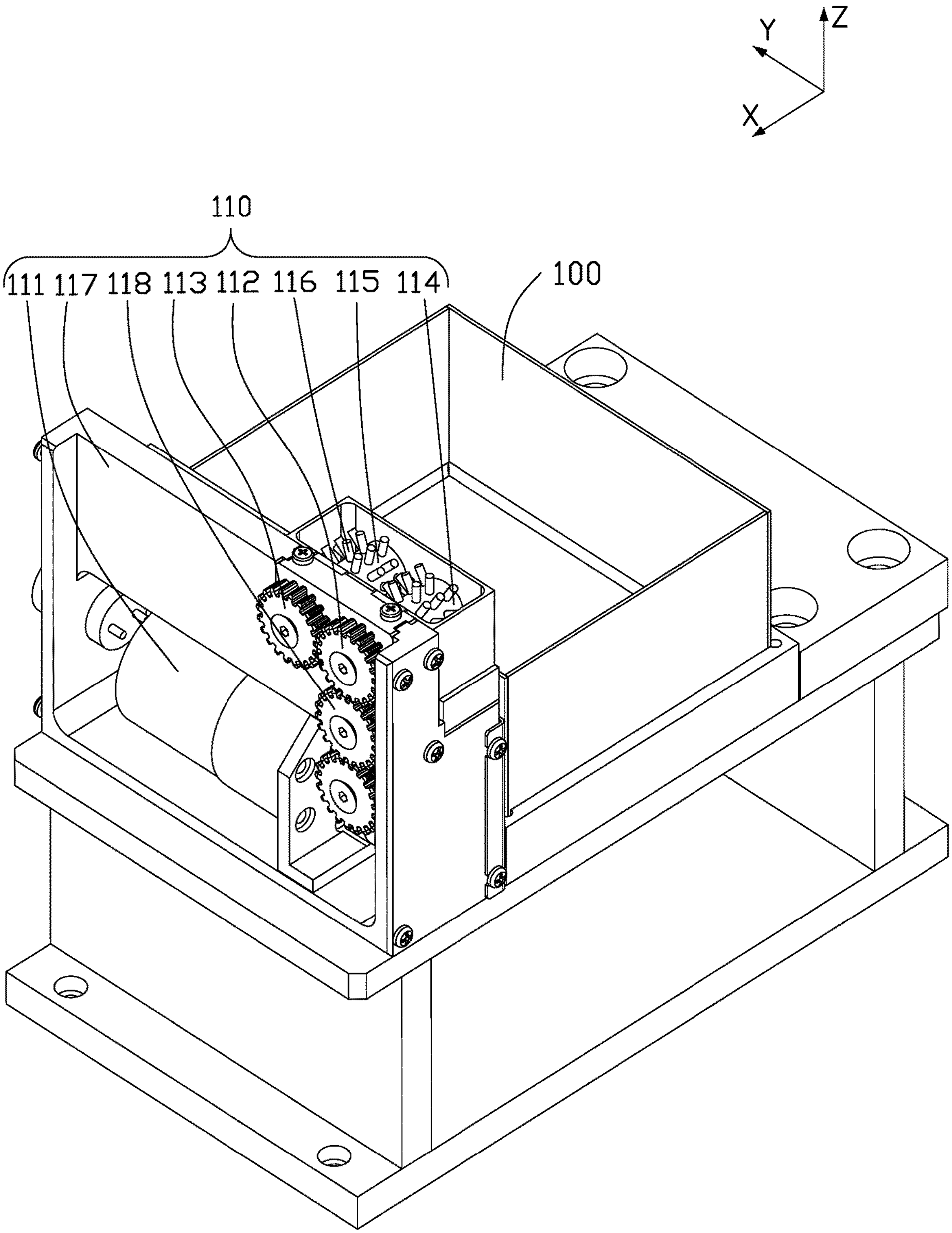
FIG. 4 is a perspective view of a collecting mechanism and a wiping mechanism according to an embodiment of the present disclosure.

Referring to FIG. 3, according to further embodiments, the liquid introduction apparatus 300 may further include a collecting mechanism 100. The collecting mechanism 100 is arranged on the platform 10 and received in the confined space 31. The collecting mechanism 100 is configured for collecting excess or hardened adhesive or glue discharged from the introduction mechanism 20. Since the adhesive or glue in the introduction nozzle 201 or the adhesive or glue adjacent to the introduction nozzle 201 may be easy to be hardened, in order to ensure the quality of the liquid injected into the product 200, the hardened adhesive or glue in the introduction mechanism 20 should be discharged. Or when the type of adhesive or glue injected into the product 200 needs to be changed, the original excess adhesive or glue in the introduction mechanism 20 also should be discharged to store another type of liquid. The collecting mechanism 100 in the confined space 31 can collect excess or hardened adhesive or glue from the introduction mechanism 20 without opening the housing 30, which helps to prevent the influence of the external environment on the adhesive or glue and improve the quality of the adhesive or glue injected into the product 200. Referring to FIG. 4, the collecting mechanism 100 may be a collecting box, a collecting tank, or any other vessel capable of containing liquid.

Referring to FIG. 3, according to further embodiments, the liquid introduction apparatus may further include a wiping mechanism 110. The wiping mechanism 110 is arranged on the platform 10 and received in the confined space 31, the wiping mechanism 110 is configured for wiping up and removing adhesive or glue adhering to outer surface of the introduction nozzle 201. Therefore, after the introduction nozzle 201 is cleaned by the wiping mechanism 110, it is easier to connect the introduction nozzle 201 with the introduction nozzle 201, and the quality of the adhesive or glue injected into the product 200 can also be improved.

Specifically, referring to FIG. 4, the wiping mechanism 110 includes a wiping driver 111, a first gear 112, a second gear 113, a first wiping member 114, and a second wiping member 115. The wiping driver 111 may be an electric rotating machine, and the wiping driver 111 is arranged on the platform 10. The wiping driver 111 is connected to the first gear 112 for driving the first gear 112. The first gear 112 is further engaged with the second gear 113. The first wiping member 114 and the second wiping member 115 are respectively connected to the first gear 112 and the second gear 113. The first gear 112 and the second gear 113 drive the first wiping member 114 and the second wiping member 115 to rotate respectively relative to the introduction nozzle 201. The liquid adhering to an outer surface of the introduction nozzle 201 can be wiped up repeatedly by the first wiping member 114 and the second wiping member 115. Accordingly, the introduction nozzle 201 can thus be maintained in a clean condition.

According to a further embodiment, both of the periphery of the first wiping member 114 and the periphery of the second wiping member 115 are provided with multiple protrusions 116. The multiple protrusions 116 can wipe up the outer surface of the introduction nozzle 201. The liquid is hardly sticked to the protrusions 116 of the first wiping member 114 and the second wiping member 115, which enhances service life of the first wiping member 114 and the second wiping member 115. It should be noted that, the protrusions 116 of the first wiping member 114 and the second wiping member 115 may be sponges or any other suitable member capable of wiping up liquid. The periphery of the first wiping member 114 and the periphery of the second wiping member 115 may be preferably made of elastic material, which can be deformed when in contact with the introduction nozzle 201 so as to be in close contact with introduction nozzle 201, so that the liquid on the outer surface of the introduction nozzle 201 can be wiped up more easily. At the same time, when the first wiping member 114 and the second wiping member 115 leave the outer surface of the introduction nozzle 201, the elastic recovery force of the first wiping member 114 and the second wiping member 115 is conducive to shaking off the liquid from the outer surface of the introduction nozzle 201.

According to further embodiment, the wiping mechanism 110 may further include a frame 117 and a transmission assembly 118. The frame 117 is mounted on the platform 10, and the wiping driver 111, the first gear 112, the second gear 113, the first wiping member 114, the second wiping member 115, and the transmission assembly 118 are mounted on the frame 117, so that it is convenient to mount, remove, or replace the wiping mechanism 110. The wiping driver 111 is connected to the first gear 112 via the transmission assembly 118, and the transmission assembly 118 may include multiple gears engaged with each other, so that the wiping speed of the first wiping member 114 and the second wiping member 115 on the introduction nozzle 201 can be adjusted by the transmission assembly 118.

Referring to FIG. 1, according to further embodiments, the liquid introduction apparatus 300 may further include a transporting channel 120 arranged on the housing 30. One end of the transporting channel 120 extends into the confined space 31 and is connected to the reservoir 202 of the introduction mechanism 20, the other end of the transporting channel 120 is located outside of the confined space 31 for connecting a liquid supply apparatus (not shown). The liquid supply apparatus supplies liquid to the reservoir 202 of the introduction mechanism 20 via the transporting channel 120. The transporting channel 120 enables adhesive or glue to have a continuous supply for the introduction mechanism 20 and secures a continuous operation of the liquid introduction apparatus 300.

According to further embodiments, Referring to FIG. 1, the liquid introduction apparatus 300 may further include a pair of drivers 130 and a cover 140, the pair of drivers 130 are mounted on the housing 30. An opening 32 is defined in the housing 30 for picking up and placing the product 200 in the housing 30. The pair of drivers 130 are arranged on opposite sides of the opening 32, and the cover 140 is connected to the pair of drivers 130 for being driven to move to expose or cover the opening 32. In an alternative embodiment, opposite sides of the cover 140 are arranged with wheels (not shown) for a rolling ability relative to the opening 32. The wheels can reduce friction when the cover 140 is moved.

In an alternative embodiment, the liquid introduction apparatus 300 may further include a pair of sliding rails 150 arranged on the housing 30 and located on opposite sides of the opening 32, the cover 140 is driven by the pair of drivers 130 to move along the sliding rails 150 to cover the opening 32 to define the confined space 31, and to expose the opening 32 for picking and placing the product 200 via the opening 32.

In an alternative embodiment, a guiding groove 151 may be defined in each rail 150 for receiving the wheels. When the cover 140 is driven by the drivers 130, the wheels of the cover 140 rolls in the guiding grooves 151, and the cover 140 moves along the second guiding rails 150 to cover or expose the opening 32. The wheels rolling in the guiding groove 151 provides smooth movement of the cover 140. In this embodiment, the driver 130 can be a telescopic pole. It should be noted that, the driver 130 can be a linear cylinder or any other apparatus capable of reciprocating movement. In an alternative embodiment, only one driver 130 is arranged.

According to a further embodiment, the cover 140 is made of light transmitting materials or includes a portion made of light transmitting materials. Therefore, the user can observe a current situation in the confined space 31 via the cover 140.

Referring to FIG. 1, according to further embodiments, the liquid introduction apparatus 300 may further include a sealing element 160. The sealing element 160 is arranged on the housing 30, and the sealing element 160 surrounds a peripheral edge of the housing 30 defining the opening 32 to seal a gap between the cover 140 and the housing 30 when the cover 140 covers the opening 32. The sealing element 160 prevents air leaks from the confined space 31. In this embodiment, the sealing element 160 may be made of rubber material.

Referring to FIG. 1, in at least one embodiment, one end of the guiding groove 151 may be curved towards the confined space 31, such that the cover 140 may press against the sealing element 160 at the end of travel to improve air tightness between the cover 140 and the housing 30 when the cover 140 is driven to move to cover the opening 32, and the cover 140 may be prevented from frictionally interfering with the cover 30 when the cover 140 is driven to move to expose the opening 32.

The operation of the liquid introduction apparatus 300 according to some embodiments may be as follows: the driver 130 drives the cover 140 to expose the opening 32, the product 200 is placed on the transfer mechanism 70 via the opening 32, and the driver 130 drives the cover 140 to cover the opening 32 to define the confined space 31, the air extracting apparatus extracts air from the confined space 31 to create a vacuum environment. Then the transfer mechanism 70 and the nozzle driving mechanism 90 cooperate with each other to connect the introduction nozzle 201 to the product 200, the introduction mechanism 20 injects liquid into the product 200 after the introduction nozzle 201 is connected to the product 200, and the nozzle driving mechanism 90 moves the introduction nozzle 201 away from the product 200 after the product 200 is injected, the transfer mechanism 70 moves the injected product 200 to the opening 32. After that, the second valve 60 breaks the vacuum environment and the confined space 31 can be at atmospheric pressure, the driver 130 drives the cover 140 to expose the opening 32, and the injected product 200 can be picked up via the opening 32.

According to the embodiment, the liquid introduction apparatus 300 operates by cooperation of the platform 10, the introduction mechanism 20, the housing 30, the extraction port 40, and other mechanisms. The opening 32 defined on the housing 30 provides access to pick up and place the product 200, the cover 140 covers the extraction port 40 to define a confined space 31, the air extracting apparatus extracts air from the confined space 31 to form a vacuum environment. The introduction mechanism 20, the product 200, and other mechanisms, and the introduction mechanism 20 can introduce liquid into the product 200 in the vacuum environment. The vacuum environment eliminates influences of air affecting the flow or introduction of the liquid, the liquid can flow smoothly in the product 200 at higher speed than that in non-vacuum environment, the efficiency of introduction and the production efficiency of the products 2 are improved. Further, the vacuum environment avoids creation of bubbles in the liquid, the liquid will uniformly fill in the product 200 as required, which avoids the defects of poor filling saturation or insufficient compactness, and improves the yield rate of the production. In addition, the confined space 31 provides a vacuum environment for operation of the introduction mechanism 20 and the product 200, the entire liquid introduction and curing processes can be performed in the vacuum environment, which avoids influences of environment changes affecting the fluid introduction or distribution.

According to some embodiments, referring to FIG. 1 and FIG. 3, an adhesive dispensing apparatus 300 for introducing liquid into a product 200 is provided. The adhesive dispensing apparatus 300 includes a platform 10, an adhesive dispensing mechanism 20 arranged on the platform 10, and a housing 30 mounted to the platform 10. The platform 10 is configured for supporting the product 200, a confined space 31 is defined by the housing 30 and the platform 10, the adhesive dispensing mechanism 20 and the product 200 are received in the confined space 31. The adhesive dispensing mechanism 20 includes an introduction nozzle 201, the introduction nozzle 201 is configured for introducing liquid into the product 200 when the confined space 31 has a vacuum environment.

While the disclosure has been described in detail with only a limited number of embodiments, it should be readily understood for the skilled in the art that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A liquid introduction apparatus for introducing liquid into a product, comprising:

a platform;

a transfer mechanism arranged on the platform and configured for supporting the product and moving the product along a predetermined movement direction;

an introduction mechanism arranged on the platform;

a housing mounted on the platform; and a transporting channel arranged on the housing;

wherein a confined space is defined by the housing and the platform, the introduction mechanism, the transfer mechanism and the product are received in the confined space; one end of the transporting channel extends into the confined space and is connected to the introduction mechanism, the other end of the transporting channel is located outside of the confined space and is connected to a liquid supply apparatus, and the liquid supply apparatus is configured for supplying liquid to the introduction mechanism through the transporting channel, the introduction mechanism is configured for introducing the liquid into the product in a vacuum environment by discharging air from the confined space.

2. The liquid introduction apparatus of claim 1, wherein the introduction mechanism comprises an introduction nozzle, the liquid introduction apparatus further comprises an image acquisition device, the image acquisition device is arranged on the transfer mechanism and movable with the transfer mechanism, and the image acquisition device is configured for acquiring images of the introduction nozzle and the product to align the introduction nozzle with the product for introducing the liquid into the product.

3. The liquid introduction apparatus of claim 2, wherein the image acquisition device comprises a first camera and a second camera each mounted in and movable with the transfer mechanism, the first camera and the second camera are arranged along different axes and configured for catching pictures of the introduction nozzle from different directions to determine whether the introduction nozzle is inclined to the product.

4. The liquid introduction apparatus of claim 1, wherein the introduction mechanism comprises a first introduction mechanism and a second introduction mechanism;

the transfer mechanism comprises a first guiding rail;

the first introduction mechanism and the second introduction mechanism are located on opposite sides of the first guiding rail, the first introduction mechanism and the second introduction mechanism are configured for introducing liquid in the product.

5. The liquid introduction apparatus of claim 2, further comprising:

a nozzle driving mechanism arranged on the platform and received in the confined space, wherein the nozzle driving mechanism is connected to the introduction nozzle and the nozzle driving mechanism is configured for moving the introduction nozzle for connecting the introduction nozzle to the product according to the images acquired by the image acquisition device.

6. The liquid introduction apparatus of claim 1, further comprising:

a collecting mechanism arranged on the platform and received in the confined space, wherein the collecting mechanism is configured for collecting excess or hardened liquid discharged by the introduction mechanism.

7. The liquid introduction apparatus of claim 2, further comprising:

a wiping mechanism arranged on the platform and received in the confined space, wherein the wiping mechanism is configured for wiping up and removing liquid on an outer surface of the introduction nozzle.

8. The liquid introduction apparatus of claim 7, wherein the wiping mechanism comprises:

a wiping driver arranged on the platform;

a first gear and a second gear, both arranged on the platform, wherein the first gear is engaged with the second gear, the wiping driver is connected to the first gear;

a first wiping member connected to the first gear and a second wiping member connected to the second gear, wherein the first gear causes the first wiping member to rotate relative to the introduction nozzle and the second gear causes the second wiping member to rotate relative to the introduction nozzle such that the introduction nozzle can be wiped up repeatedly.

9. The liquid introduction apparatus of claim 1, wherein an opening is defined in the housing for picking up and placing the product;

the liquid introduction apparatus further comprising:

a driver mounted on the platform;

a cover connected to the driver for being driven to move for exposing or covering the opening, wherein wheels are arranged on opposite sides of the cover; and a pair of second guiding rails arranged on the housing and located on opposite sides of the opening, wherein a guiding groove is defined in each of the pair of second guiding rails for receiving the wheels on respective side of the cover, when the cover is driven by the driver, the wheels of the cover rolls in the guiding grooves, and the cover moves along the second guiding rails to expose or cover the opening.

10. The liquid introduction apparatus of claim 9, further comprising:

a sealing element arranged on the housing, wherein the sealing element surrounds a peripheral edge of the housing defining the opening for sealing a gap between the cover and the housing when the cover covers the housing;

one end of the guiding groove is curved towards the confined space, such that the cover presses against the sealing element when the cover covers the housing.

11. The liquid introduction apparatus of claim 1, further comprising:

a first valve arranged on the housing or the platform, the first valve being configured for allowing or preventing air in the confined space from being extracted;

a vacuum breaking port defined in the platform;

a second valve connected to the vacuum breaking port;

the second valve being configured for communicating the vacuum breaking port with external atmosphere.

12. The liquid introduction apparatus of claim 8, wherein both of a periphery of the first wiping member and a periphery of the second wiping member are provided with multiple protrusions, each of the multiple protrusions is made of elastic material, and the multiple protrusions is configured for wiping up the outer surface of the introduction nozzle.

13. An adhesive dispensing apparatus for introducing adhesive into a product, comprising:

a platform;

a transfer mechanism arranged on the platform and configured for supporting the product and moving the product along a predetermined movement direction;

an adhesive dispensing mechanism arranged on the platform;

a housing mounted on the platform; and a transporting channel arranged on the housing;

wherein a confined space is defined by the housing and the platform, the-adhesive dispensing mechanism, the transfer mechanism and the product are received in the confined space; one end of the transporting channel extends into the confined space and is connected to the introduction mechanism, the other end of the transporting channel is located outside of the confined space and is connected to a liquid supply apparatus, and the liquid supply apparatus is configured for supplying adhesive to the introduction mechanism through the transporting channel, the adhesive dispensing mechanism comprises an introduction nozzle, the introduction nozzle dispenses the adhesive into the product in a vacuum environment by discharging air from the confined space.

14. The adhesive dispensing apparatus of claim 13, further comprising:

a wiping mechanism arranged on the platform and received in the confined space, wherein the wiping mechanism is configured for wiping up and removing the adhesive on an outer surface of the introduction nozzle.

15. The adhesive dispensing apparatus of claim 14, wherein the wiping mechanism comprises:

a wiping driver arranged on the platform;

a first gear and a second gear, both arranged on the platform, wherein the first gear is engaged with the second gear, the wiping driver is connected to the first gear;

a first wiping member connected to the first gear and a second wiping member connected to the second gear, wherein the first gear causes the first wiping member to rotate relative to the introduction nozzle and the second gear causes the second wiping member to rotate relative to the introduction nozzle such that the introduction nozzle can be wiped up repeatedly.

16. The adhesive dispensing apparatus of claim 13, wherein an opening is defined in the housing for picking up and placing the product;

the adhesive dispensing apparatus further comprising:

a pair of drivers mounted on the housing and arranged on opposite sides of the opening;

a cover made of light transmitting materials connected to the pair of drivers for being driven to move for exposing or covering the opening, wherein wheels are arranged on opposite sides of the cover; and a pair of guiding rails arranged on the housing and located on opposite sides of the opening, wherein a guiding groove is defined in each of the pair of guiding rails for receiving the wheels on respective side of the cover, when the cover is driven by the pair of drivers, the wheels of the cover rolls in the guiding grooves, and the cover moves along the guiding rails to expose or cover the opening.

17. The adhesive dispensing apparatus of claim 16, further comprising:

a sealing element arranged on the housing, wherein the sealing element surrounds a peripheral edge of the housing defining the opening for sealing a gap between the cover and the housing when the cover covers the housing;

one end of the guiding groove is curved towards the confined space, such that the cover presses against the sealing element at the end of travel when the cover is driven to move to cover the housing.

18. The adhesive dispensing apparatus of claim 15, wherein both of a periphery of the first wiping member and a periphery of the second wiping member are provided with multiple protrusions, each of the multiple protrusions is made of elastic material, the multiple protrusions is configured for wiping up the outer surface of the introduction nozzle.

19. The adhesive dispensing apparatus of claim 13, further comprising:

a first camera and a second camera each mounted in and movable with the transfer mechanism, wherein the first camera and the second camera are arranged along different axes and configured for catching pictures of the introduction nozzle from different directions to determine whether the introduction nozzle is inclined to the product.

20. The adhesive dispensing apparatus of claim 13, further comprising:

an image acquisition device, wherein the image acquisition device is arranged on the transfer mechanism and movable with the transfer mechanism, and the image acquisition device is configured for acquiring images of the introduction nozzle and the product to align the introduction nozzle with the product for introducing the adhesive into the product.

* * * * *